US011269059B2

(12) United States Patent
Patel et al.

(10) Patent No.: US 11,269,059 B2
(45) Date of Patent: Mar. 8, 2022

(54) LOCATING AND/OR CLASSIFYING OBJECTS BASED ON RADAR DATA, WITH IMPROVED RELIABILITY AT DIFFERENT DISTANCES

(71) Applicant: Robert Bosch GmbH, Stuttgart (DE)

(72) Inventors: Kanil Patel, Stuttgart (DE); Kilian Rambach, Stuttgart (DE); Michael Pfeiffer, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 16/716,703

(22) Filed: Dec. 17, 2019

(65) Prior Publication Data

US 2020/0200871 A1 Jun. 25, 2020

(30) Foreign Application Priority Data

Dec. 21, 2018 (DE) .......................... 102018222800.0

(51) Int. Cl.
*G01S 7/41* (2006.01)
*G01S 13/72* (2006.01)
(Continued)

(52) U.S. Cl.
CPC ............ *G01S 7/417* (2013.01); *G01S 13/726* (2013.01); *G01S 13/931* (2013.01)

(58) Field of Classification Search
CPC ...... G01S 7/417; G01S 13/726; G01S 13/931; G01S 13/87; G01S 2013/9316;
(Continued)

(56) References Cited

U.S. PATENT DOCUMENTS 3,883,726 A * 5/1975 Schmidt ................ G06F 17/142
708/404
4,680,589 A * 7/1987 Bryant .................. G01S 7/2921
342/159
(Continued)

FOREIGN PATENT DOCUMENTS

DE 19706576 A1 8/1998
WO 2018183546 A1 10/2018

OTHER PUBLICATIONS

Molchanov, et al.: "Multisensor System for Driver's Hand-Gesture Recognition" in IEEE International Conference and Workshop on Automatie Face and Gesture Recognition, May 2015, pp. 1-8.
(Continued)

*Primary Examiner* — Bernarr E Gregory
(74) *Attorney, Agent, or Firm* — Norton Rose Fulbright US LLP; Gerard Messina

(57) ABSTRACT

A method is described for locating and/or classifying at least one object, a radar sensor that is used including at least one transmitter and at least one receiver for radar waves. The method includes: the signal recorded by the receiver is converted into a two- or multidimensional frequency representation; at least a portion of the two- or multidimensional frequency representation is supplied as an input to an artificial neural network, ANN that includes a sequence of layers with neurons, at least one layer of the ANN being additionally supplied with a piece of dimensioning information which characterizes the size and/or absolute position of objects detected in the portion of the two- or multidimensional frequency representation; the locating and/or the classification of the object is taken from the ANN as an output.

17 Claims, 6 Drawing Sheets

(51) Int. Cl.
*G01S 13/931* (2020.01)
*G01S 13/00* (2006.01)

(58) Field of Classification Search
CPC ........ G01S 7/2883; G01S 7/356; G01S 13/86; G01S 7/2955; G01S 2013/93271; G01S 2013/9322; G01S 7/415; G01S 7/4056; G01S 7/2921; G01S 13/584; G06K 9/6267; G06N 3/0454; G06N 3/082; G06F 9/3001; G06F 17/142
See application file for complete search history.

(56) References Cited

U.S. PATENT DOCUMENTS

| | | | | |
|---|---|---|---|---|
| 5,233,354 | A * | 8/1993 | Roth | G01S 7/417 342/160 |
| 5,235,339 | A * | 8/1993 | Morrison | G01S 7/417 342/159 |
| 5,345,539 | A * | 9/1994 | Webb | G01S 7/417 706/24 |
| 5,504,487 | A * | 4/1996 | Tucker | G01S 7/417 342/159 |
| 5,613,039 | A * | 3/1997 | Wang | G01S 7/417 706/24 |
| 5,835,901 | A * | 11/1998 | Duvoisin, III | G06N 3/082 706/19 |
| 5,949,367 | A * | 9/1999 | Trompf | G01S 7/417 342/90 |
| 6,366,236 | B1 * | 4/2002 | Farmer | G01S 7/417 342/118 |
| 6,430,587 | B1 * | 8/2002 | Orling | G06F 17/142 708/400 |
| 8,566,382 | B2 * | 10/2013 | Pearlstein | G06F 9/3001 708/424 |
| 8,682,821 | B2 | 3/2014 | Benitez et al. | |
| 10,067,227 | B2 * | 9/2018 | Kamo | G01S 7/417 |
| 10,996,311 | B2 * | 5/2021 | Roger | G01S 13/584 |
| 2010/0321229 | A1 * | 12/2010 | Dwelly | G01S 7/417 342/28 |
| 2019/0391251 | A1 * | 12/2019 | Bharadwaj, Jr. | G01S 7/4056 |

OTHER PUBLICATIONS

Perez, et al.: "Single-Frame Vulnerable Road Users Classification with a 77 GHz FMCW Radar Sensor and a Convolutional Neural Network" in The 19th International Radar Symposium IRS 2018, pp. 1-10.

* cited by examiner

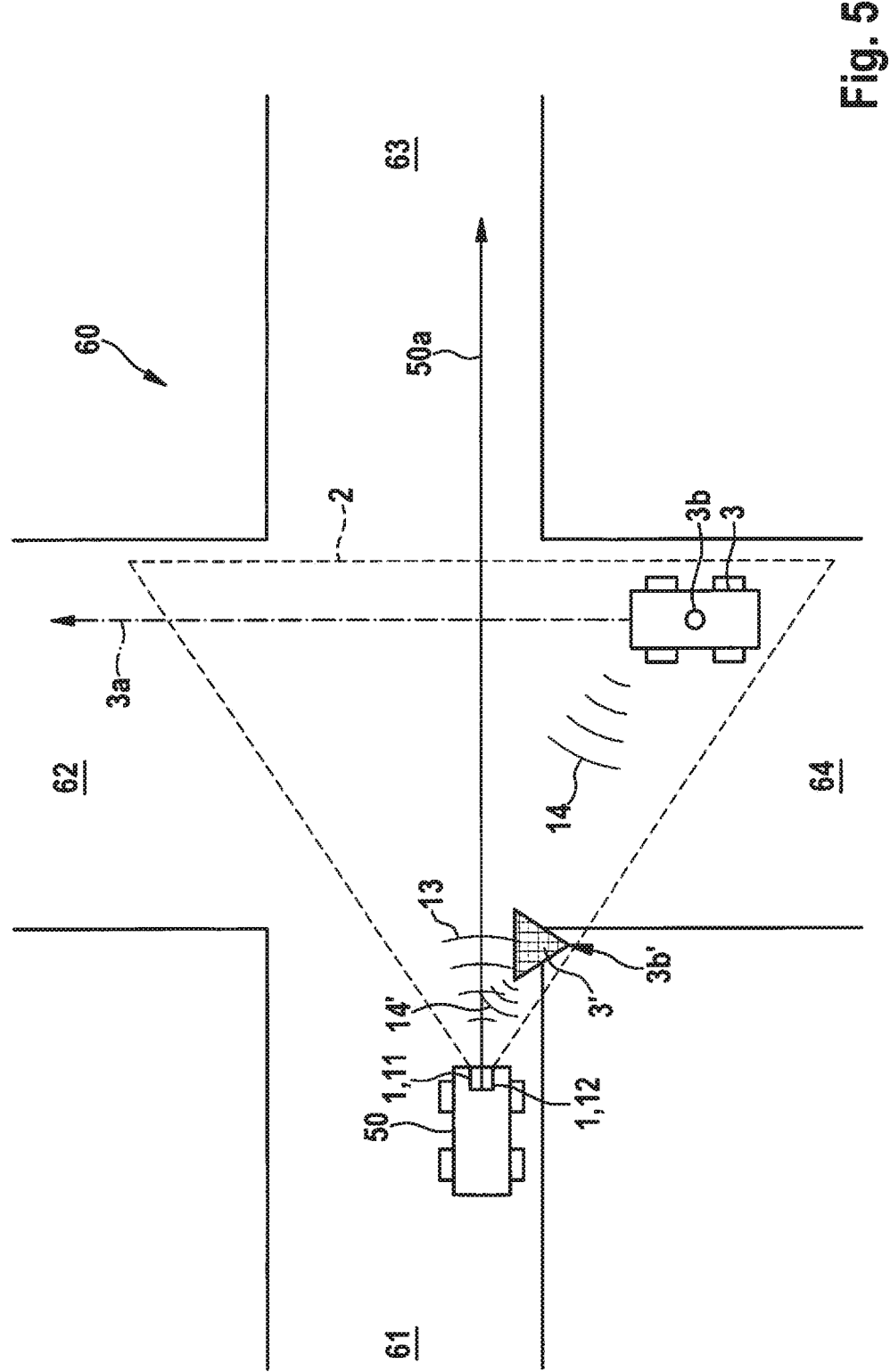

LOCATING AND/OR CLASSIFYING OBJECTS BASED ON RADAR DATA, WITH IMPROVED RELIABILITY AT DIFFERENT DISTANCES

CROSS REFERENCE

The present application claims the benefit under 35 U.S.C. § 119 of German Patent Application No. DE 102018222800.0 filed on Dec. 21, 2018, which is expressly incorporated herein by reference in its entirety.

FIELD

The present invention relates to locating and/or classifying objects situated in an area that is monitored by a radar sensor.

BACKGROUND INFORMATION

In order for a vehicle to be able to move in road traffic in an at least semi-automated manner, it is necessary to detect the surroundings of the vehicle, and to initiate countermeasures if there is a risk of a collision with an object in the surroundings of the vehicle. Creating a representation of the surroundings and localization are also necessary for safe automated driving.

The detection of objects with the aid of radar is independent of the light conditions, and for example even at night is possible at a fairly great distance without oncoming traffic being blinded by high-beam light. In addition, the distance and speed of objects result directly from the radar data. This information is important for assessing whether a collision with the objects is possible. However, the type of object in question is not directly recognizable from radar signals. This recognition is presently achieved by computing attributes from the digital signal processing.

U.S. Pat. No. 8,682,821 B2 describes the classification of radar signals, with the aid of machine learning, as to whether they originate from the movement of certain objects or nonhuman animals. This knowledge may be utilized to avoid false alarms when monitoring an area for human intruders, or also to select the correct action to avoid a collision for at least semi-automated driving.

SUMMARY

In accordance with the present invention, an example method for locating and/or classifying at least one object in an area that is monitored by at least one radar sensor is provided. The radar sensor includes at least one transmitter and at least one receiver for radar waves.

The signal recorded by the receiver is converted into a two- or multidimensional frequency representation. In this frequency representation, in particular for example one direction may represent the distance of an object from the radar sensor, and another direction may represent azimuth angle $\alpha$ of the object relative to the radar sensor. In addition, for example a further direction may represent an elevation angle of the object relative to the radar sensor and/or a speed of the object relative to the radar sensor.

At least a portion of the two- or multidimensional frequency representation is supplied as an input to an artificial neural network (ANN), which includes a sequence of layers with neurons. The locating and/or the classification of the object are/is taken from the ANN as an output.

In addition, a piece of dimensioning information which characterizes the size and/or absolute position of objects detected in the portion of the two- or multidimensional frequency representation is supplied to at least one layer of the ANN.

It has been recognized that the piece of information concerning objects, contained in the portion of the two- or multidimensional frequency representation, is frequently ambiguous, in particular with respect to its classification. Thus, for example, a near, small object on the one hand and a distant, large object on the other hand may have a very similar appearance in the two- or multidimensional frequency representation. This is due to the physical nature of the radar measurement, which as a measured variable ultimately detects which portion of the radiation that is emitted into the monitored area is reflected, and from what solid angle in this area.

Such ambiguities may be resolved with the additional piece of dimensioning information. For example, the classification by the ANN may from the outset concentrate on objects in a certain size range that is consistent with the piece of dimensioning information. However, it is also possible, for example, to initially form an ambiguous classification, and to subsequently resolve this ambiguity, using the piece of dimensioning information.

Even a piece of very rough dimensioning information achieves a noticeable effect. Thus, for example, just the piece of information of whether the analyzed portion of the two- or multidimensional frequency representation refers to an object 10 m away or an object 100 m away excludes many incorrect classifications. The more detailed the piece of dimensioning information, the more incorrect classifications that may be excluded, and the greater the likelihood that the ANN ultimately outputs a correct classification.

Furthermore, any additionally available piece of dimensioning information also improves the locating of objects. Thus, for example, inaccuracies resulting from radar waves also reflecting on undesirable locations, or various objects having different transparencies to radar waves, may be suppressed.

In one particularly advantageous embodiment, the piece of dimensioning information characterizes
- a distance d of at least one location, detected by the portion of the two- or multidimensional frequency representation, from the radar sensor, and/or
- an azimuth angle $\alpha$ at which at least one location, detected by the portion of the two- or multidimensional frequency representation, is situated relative to the radar sensor, and/or
- a distance d' of multiple locations, detected by the portion of the two- or multidimensional frequency representation, from one another.

As discussed above, based on distance d, a distinction may be made, for example, between a near, small object on the one hand and a distant, larger object on the other hand.

For the reflection of radar waves, in the geometrical optics model the standard law of reflection applies, according to which a beam striking a surface at a certain incidence angle leaves this surface at a corresponding reflection angle. At the same time, in most radar sensors the transmitter and the receiver are comparatively close to one another. Frontal radiation from the transmitter that is incident on a surface therefore reaches the receiver with a greater likelihood and intensity than radiation that is incident on the same surface at a very acute angle. The influence of this effect on the location and/or classification ultimately obtained may be reduced by considering a piece of dimensioning information with respect to azimuth angle α.

Distance d' of multiple locations, detected by the portion of the two- or multidimensional frequency representation, from one another may be directly utilized as a measure for spatial dimensions of objects.

In one particularly advantageous embodiment, the piece of dimensioning information is supplied to the at least one layer of the ANN as a further input variable that is independent of the content of the portion of the two- or multidimensional frequency representation. For example, the piece of dimensioning information may be supplied to the layer in the form of one or multiple scalar value(s). Thus, for example, the layer may include input variables that are derived solely from the portion of the two- or multidimensional frequency representation that is input into the ANN, and the piece of dimensioning information may be additionally associated with these input variables.

When the portion of the two- or multidimensional frequency representation passes through the sequence of the layers in the ANN, its dimensionality is generally gradually reduced by one or multiple pooling layers. In this way, the ANN is able to overcome a large dimensionality differential between the input and the ultimately obtained classification. Thus, for example, a section of the frequency representation of 150×150 pixels has a dimensionality of 22,500, while the dimensionality of the classification corresponds to the number of various objects to be recognized and is usually less than 1,000. This in turn means that the further the processing has already advanced in the ANN, the greater the influence of a piece of dimensioning information that is supplied in the form of one or multiple independent input variables. The selection of the layer or layers into which the independent input variable is supplied is thus a fine tuning for the influence of this additional input variable on the classification result. The influence is greatest when the piece of dimensioning information is not added until approximately the end of a classification that is already largely completed. Thus, the piece of dimensioning information may decide approximately at the end whether a compact car that is near or a semitrailer that is more distant is recognized.

In another particularly advantageous embodiment, the piece of dimensioning information is added to the portion of the two- or multidimensional frequency representation as an additional information layer, and/or this piece of dimensioning information is superimposed on the input of the at least one layer of the ANN. This type of consideration is particularly suited for a piece of dimensioning information that varies over the frequency representation. For example, if a direction of the frequency representation represents distance d from the radar sensor, the accuracy is greatly improved if this is also reflected in the piece of dimensioning information. In addition, fewer, or even no, changes to the architecture of the ANN are necessary in order to take the piece of dimensioning information into account. For example, the piece of dimensioning information may be added to a portion of the frequency representation, present as a two- or multidimensional image, as an additional color channel.

In one advantageous embodiment, the piece of dimensioning information is taken from the two- or multidimensional frequency representation itself. For example, if one direction of this frequency representation represents distance d from radar sensor and another direction represents azimuth angle α relative to the radar sensor, the complete piece of dimensioning information is initially present. However, if a portion is now selected from this frequency representation (region of interest, ROI) in order to choose a certain object for the classification, this portion initially does not contain the piece of information concerning from which location in the original frequency representation it has been taken. Thus, this portion is lacking the originally present piece of dimensioning information. As the result of this piece of dimensioning information now being transferred to the selected portion, the act of selecting this portion no longer creates ambiguities in the classification.

In another particularly advantageous embodiment, the piece of dimensioning information is taken from measuring data that have been detected via a further sensor that is different from the radar sensor. For example, distance d or azimuth angle α may be measured via LIDAR or a similar technique. Alternatively or also in combination, the piece of dimensioning information may be taken from a digital map, for example. Such a digital map may contain, for example, stationary objects such as buildings or traffic infrastructure. A vehicle that is able to determine its own position in an arbitrary manner (by satellite, for example) may, based on this position, take information concerning its surroundings from the digital map.

In another particularly advantageous embodiment, in the portion of the two- or multidimensional frequency representation, the information outside a two- or multidimensional sphere is suppressed around the center. The selection of this portion may be even further refined in this way. In many cases, the portion of the frequency representation actually of interest with regard to a certain object has the shape of a circle or a sphere. However, a portion having this shape generally cannot be directly input into the ANN, and instead the ANN expects an input in the form of a rectangle or a square. When the observed setting contains multiple objects that are close together, an edge area of the rectangle or square with which a first object is to be selected may already contain signal components that originate from a neighboring object. These undesirable signal components may be suppressed by the described circle- or sphere-shaped masking. The masking may take place, for example, with a sharp cutting edge, so that all values of the frequency representation that are outside the circle or the sphere are set to zero. However, it is also possible, for example, to attenuate all signal components that are outside the circle or the sphere, using a linear, quadratic, exponential, or any other arbitrary function of the distance from the center. This "softens" the cutting edge and avoids edge artifacts.

In addition, it has been recognized that the accuracy of the classification may be increased not only by taking into account additional spatial piece of dimensioning information, but also by taking into account additional temporal information.

For example, if a certain object has been recognized in the monitored area at a first point in time, this object should continue to be recognized as long as it is actually situated in the monitored area. An object that suddenly appears and then suddenly disappears, for example, is possibly not actually present at all. Rather, this may involve "ghosting" or some other artifact.

Likewise, based on certain movement patterns of an object, for example, it may be deduced that the object can or cannot belong to a certain class. In the mentioned example, in which a compact car that is near is to be distinguished from a semitrailer that is farther away, for example a turning circle that the semitrailer is not able to negotiate may indicate that the object cannot be the semitrailer.

Therefore, the present invention further relates to an additional method for locating and/or classifying at least one object in an area that is monitored by at least one radar sensor. The radar sensor includes at least one transmitter and at least one receiver for radar waves.

The signal recorded by the receiver at various points in time is converted in each case into a two- or multidimensional frequency representation. Analogously to the method described above, in this frequency representation, in particular for example one direction may represent the distance of an object from the radar sensor, and another direction may represent azimuth angle α of the object relative to the radar sensor. In addition, for example a further direction may represent an elevation angle of the object relative to the radar sensor and/or a speed of the object relative to the radar sensor.

At least a portion of each of these two- or multidimensional frequency representations is supplied as an input to an artificial neural network (ANN), which includes a sequence of layers with neurons. The locating and/or the classification of the object are/is taken from the ANN as an output.

In one particularly advantageous embodiment of the present invention, a recurrent ANN is selected in which the output of at least one neuron is supplied as an input to at least one neuron of the same layer, or to at least one neuron of a preceding layer in the sequence. These networks are particularly suited for classifying temporal sequences such as movement patterns. For example, the movement patterns may be used to distinguish various types of vehicles from one another, such as on the one hand bicycles that are operated only with muscle power, and on the other hand motorcycles, which have a very similar silhouette.

In another particularly advantageous embodiment of the present invention, multiple portions of the two- or multidimensional frequency representations are jointly supplied to the same ANN as inputs. Even if it is not a recurrent network, the ANN is thus enabled to learn movement patterns.

In another particularly advantageous embodiment, multiple portions of the two- or multidimensional frequency representations are supplied in succession to the same ANN as inputs. The locatings and/or classifications obtained in each case from the ANN are aggregated to form a locating 31 and/or a classification 32.

For example, the locating may be made more accurate by averaging multiple locatings of an object which either does not move at all, or does not move in a known manner, relative to the vehicle.

Even better, multiple classifications that are obtained at different points in time may be aggregated for the same object. In many applications, in particular in road traffic, the objects in question may suddenly change their behavior, but cannot become objects of a completely different type. If the object is classified differently at different points in time, it is thus likely that some of these classifications are not correct, and the ANN has, for example, been "deceived" by poor signal quality or by artifacts.

In many cases, averaging classifications makes no sense, since among the classes there is no well-defined scalar order that satisfies the particular application. Thus, an arithmetic mean does not exist for traffic signs or vehicles. Therefore, in another particularly advantageous embodiment the classifications are aggregated into one classification. Thus, for example, if a stop sign has been recognized five times, a speed limit sign two times, and a no parking sign one time, the stop sign is the classification that is ultimately output.

According to the above discussion, in one particularly advantageous embodiment a radar sensor that is mounted on a vehicle is selected. In particular, a vehicle may be controlled as a function of the ascertained locating and/or of the ascertained classification of at least one object. For example, an actuating signal may be provided for at least one actuator of a vehicle as a function of the ascertained locating and/or of the ascertained classification, and the actuator may be controlled with this actuating signal.

The described methods may be enhanced, for example, by checking whether the up-to-date planned and/or traveled trajectory of a vehicle contact(s) the location and/or the trajectory of a recognized object. If this is the case, there may be a risk of a collision. A warning device may be activated in this case. Alternatively or also in combination, a drive system, a braking system, and/or a steering system of the vehicle may be controlled to prevent the contact.

The methods described above may be completely or partially implemented in software. This software provides the direct customer benefit of improving the reliability of the locating and classification of objects based on radar measurements, in particular when the objects appear at very different distances in front of the radar sensor. This software may be distributed, for example, as an update or upgrade to an existing system that is used for the locating and/or classification, and in this respect is a stand-alone product. Therefore, the present invention further relates to a computer program containing machine-readable instructions which, when executed on a computer and/or on a control unit, prompt the computer and/or the control unit to carry out one of the described methods. Moreover, the present invention relates to a machine-readable data medium or a download product containing the computer program.

Furthermore, the present invention relates to a computer and/or a control unit and/or a device that include(s) the computer program, the machine-readable data medium, and/or the download product. Alternatively or also in combination, for this purpose the computer, the control unit, and/or the device may be designed in any other arbitrary manner specifically to carry out one of the described methods, for example incorporating the functionality of the method into application-specific integrated circuits (ASICs) or into a field programmable gate array (FPGA).

Further measures that enhance the present invention are explained in greater detail below, together with the description of the preferred exemplary embodiments of the present invention, with reference to figures.

BRIEF DESCRIPTION OF THE DRAWINGS

FIG. 5 shows examples of scenarios in which the accuracy of classification 32 may be increased.

DETAILED DESCRIPTION OF EXAMPLE EMBODIMENTS

Figure 1:
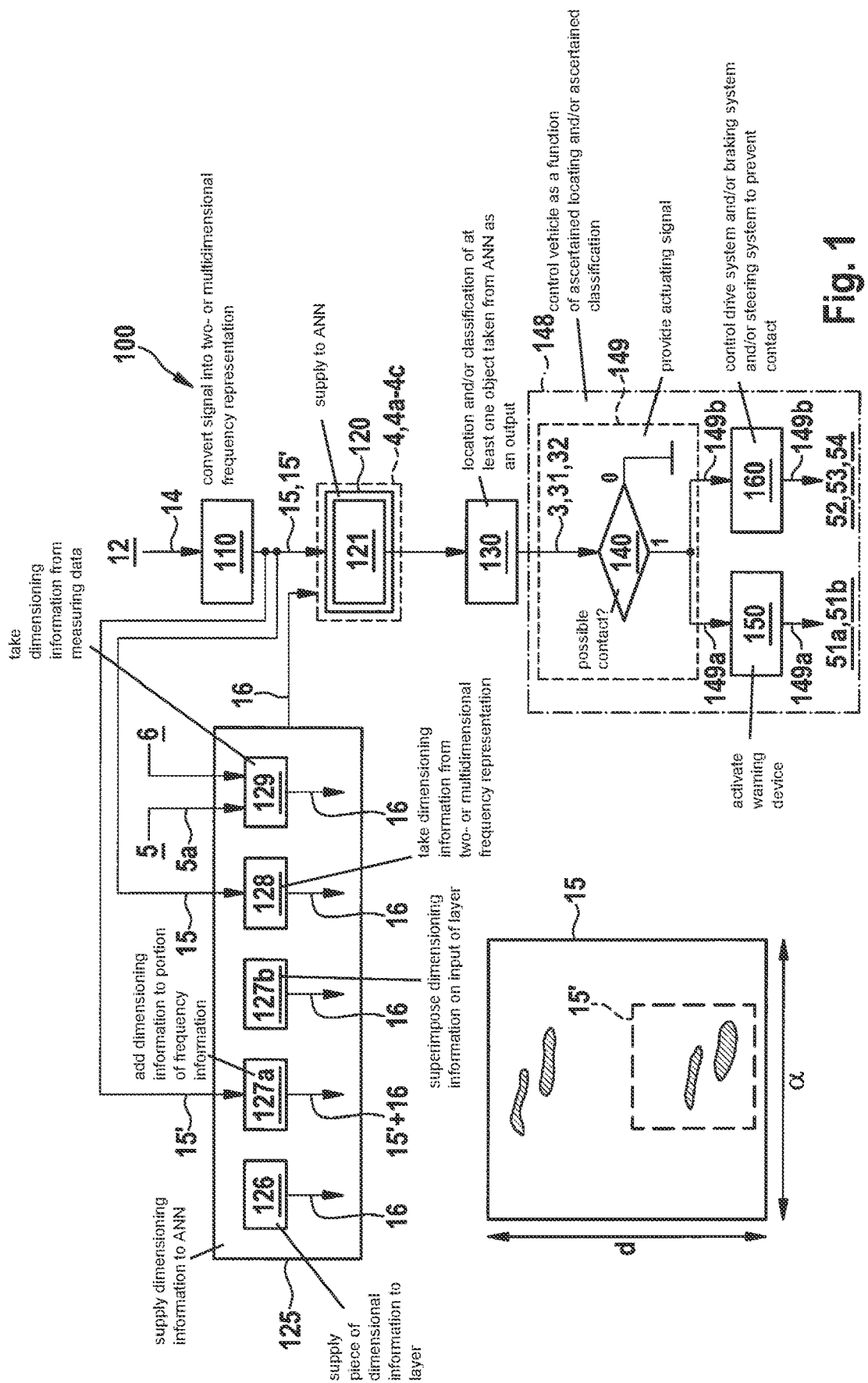
FIG. 1 shows one exemplary embodiment of method 100.

FIG. 1 shows one exemplary embodiment of method 100. Signal 14 recorded by receiver 12 is converted into a two- or multidimensional frequency representation 15 in step 110. This frequency representation 15 may be subsequently further processed in its entirety. However, as depicted at the lower left in FIG. 1, it is also possible to select a portion 15' which, for example, contains only the signal components that originate from one object.

Frequency representation 15 or portion 15' thereof is supplied to ANN 4 in step 120. Locating 31 and/or classification 32 of at least one object 3 are/is taken from ANN 4 as an output in step 130.

Piece of dimensioning information 16, which may be obtained in various ways, is supplied to at least one layer 4a through 4c of ANN 4 in step 125. FIG. 1 illustrates several examples of options for obtaining and introducing piece of dimensioning information 16.

Piece of dimensioning information 16 may be supplied to the at least one layer 4a through 4c of ANN 4 as an additional input variable according to block 126. Piece of dimensioning information 16 may be added to portion 15' of frequency representation 15, which may also correspond to complete frequency representation 15, as an additional information layer according to block 127a. Piece of dimensioning information 16 may be superimposed on the input of the at least one layer 4a through 4c of ANN 4 according to block 127b. This input, for example in first layer 4a of ANN 4, may include portion 15' of frequency representation 15, and processing products thereof in deeper layers 4b, 4c.

Piece of dimensioning information 16 may be taken from two- or multidimensional frequency representation 15 according to block 128. As depicted at the lower left in FIG. 1, frequency representation 15 is dimensioned in one direction with distance d from radar sensor 1, and in the other direction with azimuth angle α relative to the radar sensor. As explained in greater detail with reference to FIG. 2b, distance d from the location from which the signal component originates may be associated with each signal component in portion 15' of frequency representation 15.

In addition, piece of dimensioning information 16 may be taken from measuring data 5a that have been detected by a further sensor 5 that is different from radar sensor 1, according to block 129. Piece of dimensioning information 16 may also be taken from a digital map 6.

In the example shown in FIG. 1, radar sensor 1 is mounted on a vehicle 50. Following the recognition of an object 3, a check is made in step 140 as to whether up-to-date planned and/or traveled trajectory 50a of vehicle 50 contacts location 3b and/or trajectory 3a of object 3. If this is the case (truth value 1), countermeasures may be taken to prevent this contact. FIG. 5 illustrates an example of a traffic situation in which this is advantageous.

In particular, a warning device 51a that is perceivable to the driver of vehicle 50 and/or a signal horn 51b that is perceivable outside vehicle 50 may be activated in step 150. Alternatively or also in combination, a drive system 52, a braking system 53, and/or a steering system 54 of vehicle 50 may be controlled in step 160 in order to prevent the contact.

In general, vehicle 50 is controlled according to block 148 as a function of ascertained locating 31 and/or of ascertained classification 32 of at least one object 3. In particular, an actuating signal 149a, 149b for at least one actuator 51a, 51b, 52-54 of vehicle 50 is provided in subblock 149 as a function of locating 31 and/or of classification 32, and this actuator 51a, 51b, 52 through 54 is controlled with this actuating signal 149a, 149b in steps 150 and/or 160.

Figure 2A:
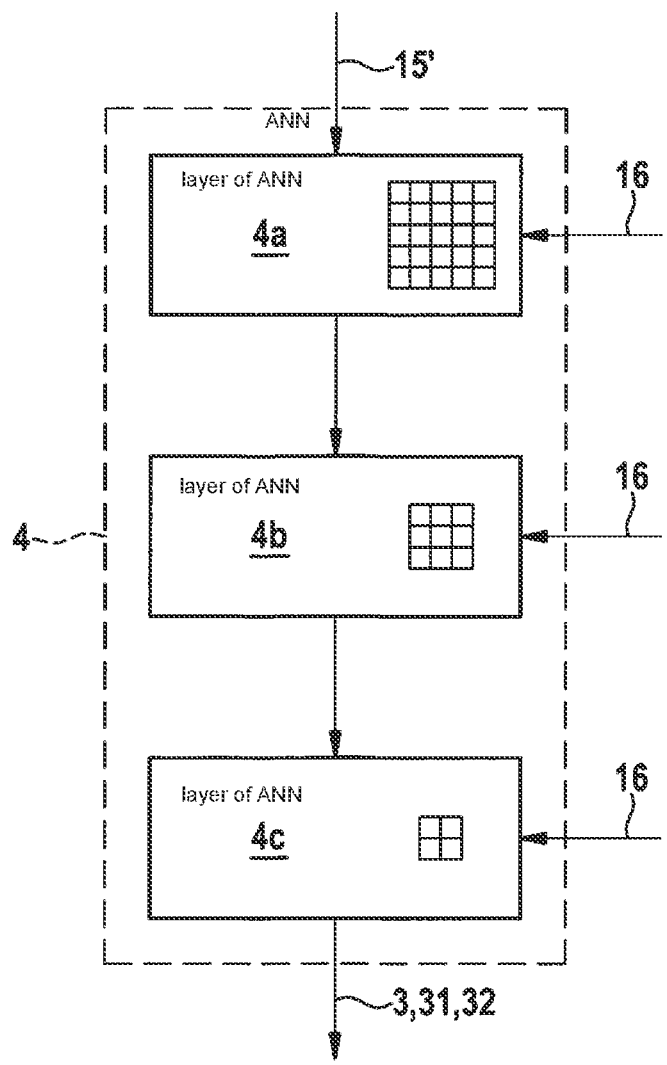
FIG. 2a-2c show examples of options for introducing a piece of dimensioning information 16.

FIG. 2a schematically shows how a portion 15' of frequency representation 15 gradually loses dimensionality while passing through ANN 4, until locating 31 and/or classification 32 of object 3 are/is ultimately formed in last layer 4c. Piece of dimensioning information 16 may now be supplied, for example, to each of these layers 4a through 4c, in addition to the input that this layer 4a through 4c already contains anyway, as one or multiple additional input variables. This may be one or multiple scalar values, for example. The weighting that these values receive during the further processing depends, among other things, on how large their dimensionality is in comparison to the other inputs of particular layer 4a through 4c. Since portion 15' gradually loses dimensionality, the weighting of piece of dimensioning information 16 tends to become increasingly greater in deeper layers 4a through 4c.

Figure 2C:
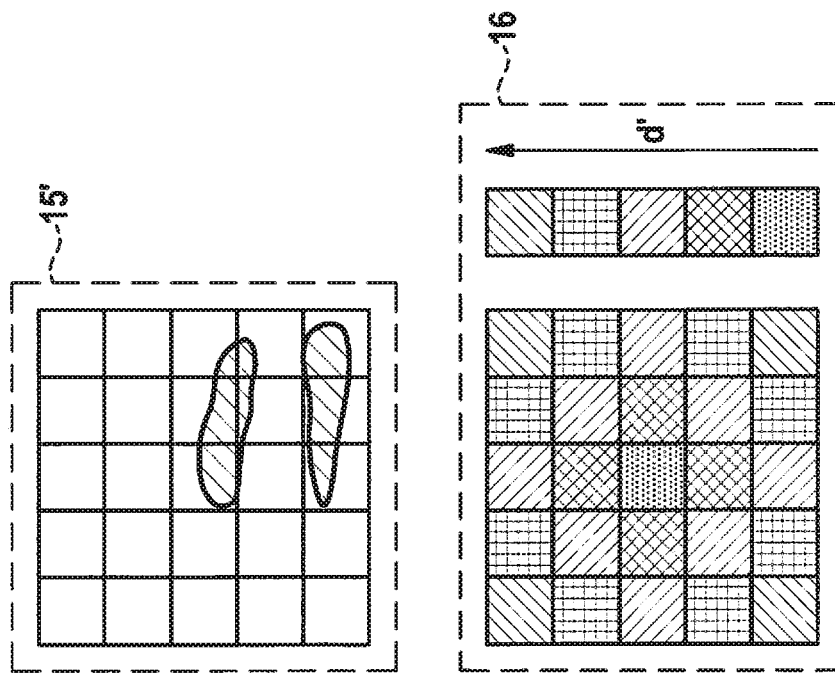
Figure 2B:
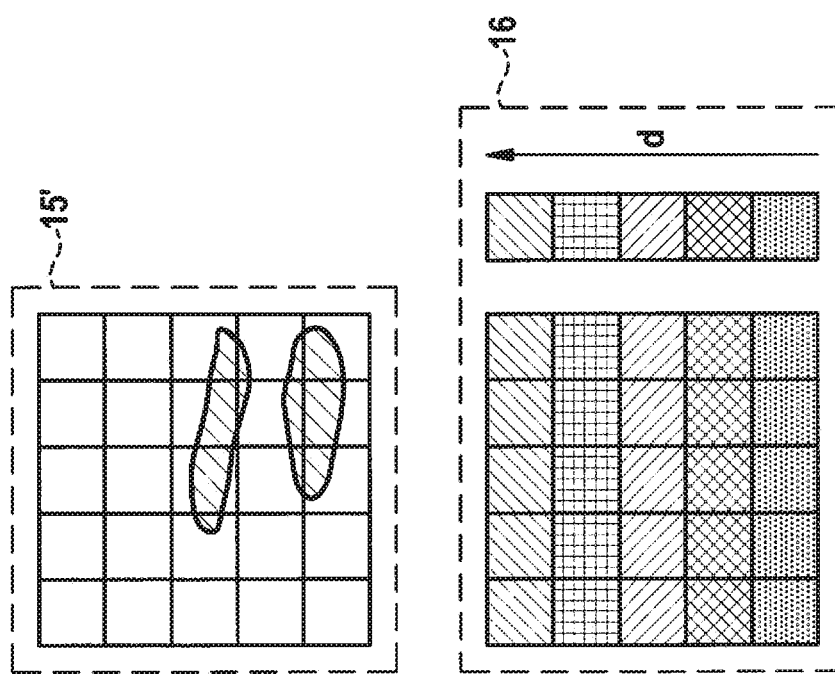

FIG. 2b schematically shows how a distance d from radar sensor 1, which varies within portion 15' of frequency representation 15, may be encoded as piece of dimensioning information 16 and added to portion 15' of frequency representation 15 as an additional information layer. In this example, portion 15' and piece of dimensioning information 16 each contain 5×5 pixels. Consistent with FIG. 1, where the vertical axis of frequency representation 15 is dimensioned with distance d, distance d also increases along the vertical axis of portion 15' of frequency representation 15. Each pixel of piece of dimensioning information 16 associates a distance d with the corresponding pixel of portion 15' of frequency representation 15.

FIG. 2c schematically shows how distance d' from the center of portion 15', which varies within portion 15' of frequency representation 15, may be encoded, similarly as for piece of dimensioning information 16 in FIG. 2b, and added to portion 15' of frequency representation 15 as an additional information layer.

Figure 3A:
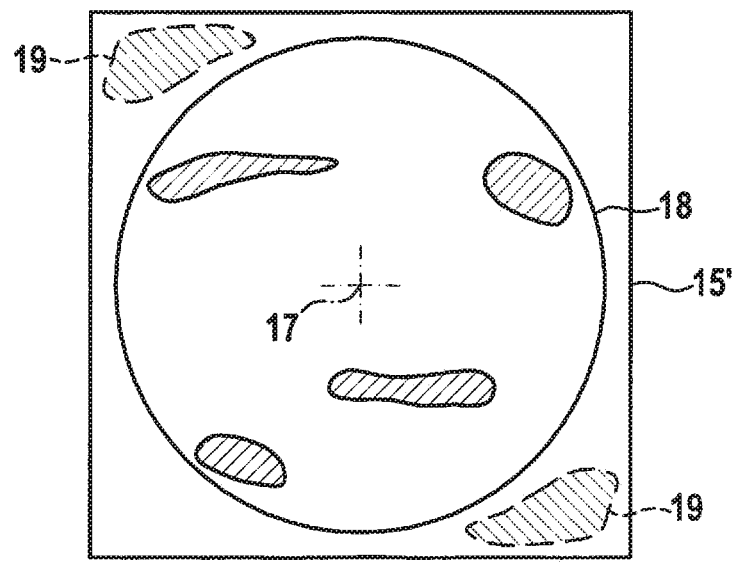
FIGS. 3a and 3b show examples of options for suppressing interfering signal components 19.
Figure 3B:
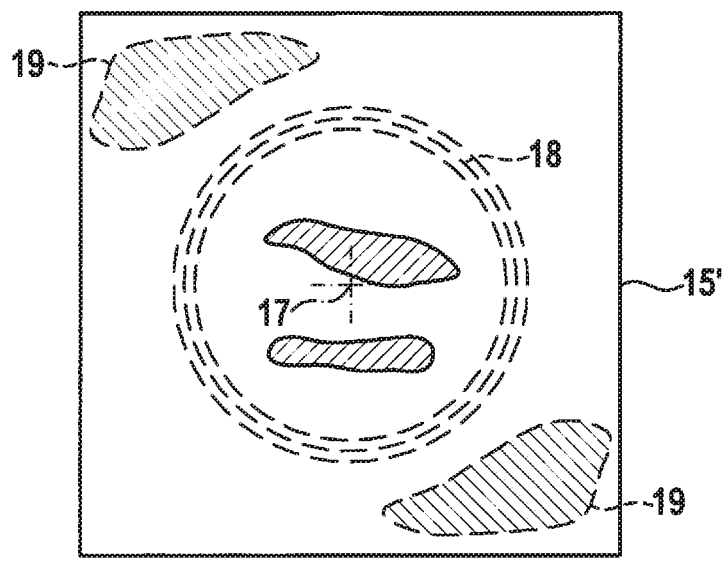

FIGS. 3a and 3b schematically show two examples of options of how interfering signal components 19 may be suppressed when evaluating portion 15' of frequency representation 15.

A distinct circle 18 is drawn around center 17 of portion 15' in FIG. 3a. The signal components within this circle 18 are maintained for the further evaluation of portion 15', while all signal components outside this circle are set to zero. Interfering signal components 19 depicted by way of example thus remain without affecting locating 31 or classification 32 that is ultimately generated from portion 15'.

Analogously, in the example shown in FIG. 3b, circle 18 has a "soft" edge. This means that the attenuation of the signal components continuously increases radially outwardly along this soft edge. Here as well, interfering signal components 19 remain without affecting locating 31 or classification 32.

Figure 4:
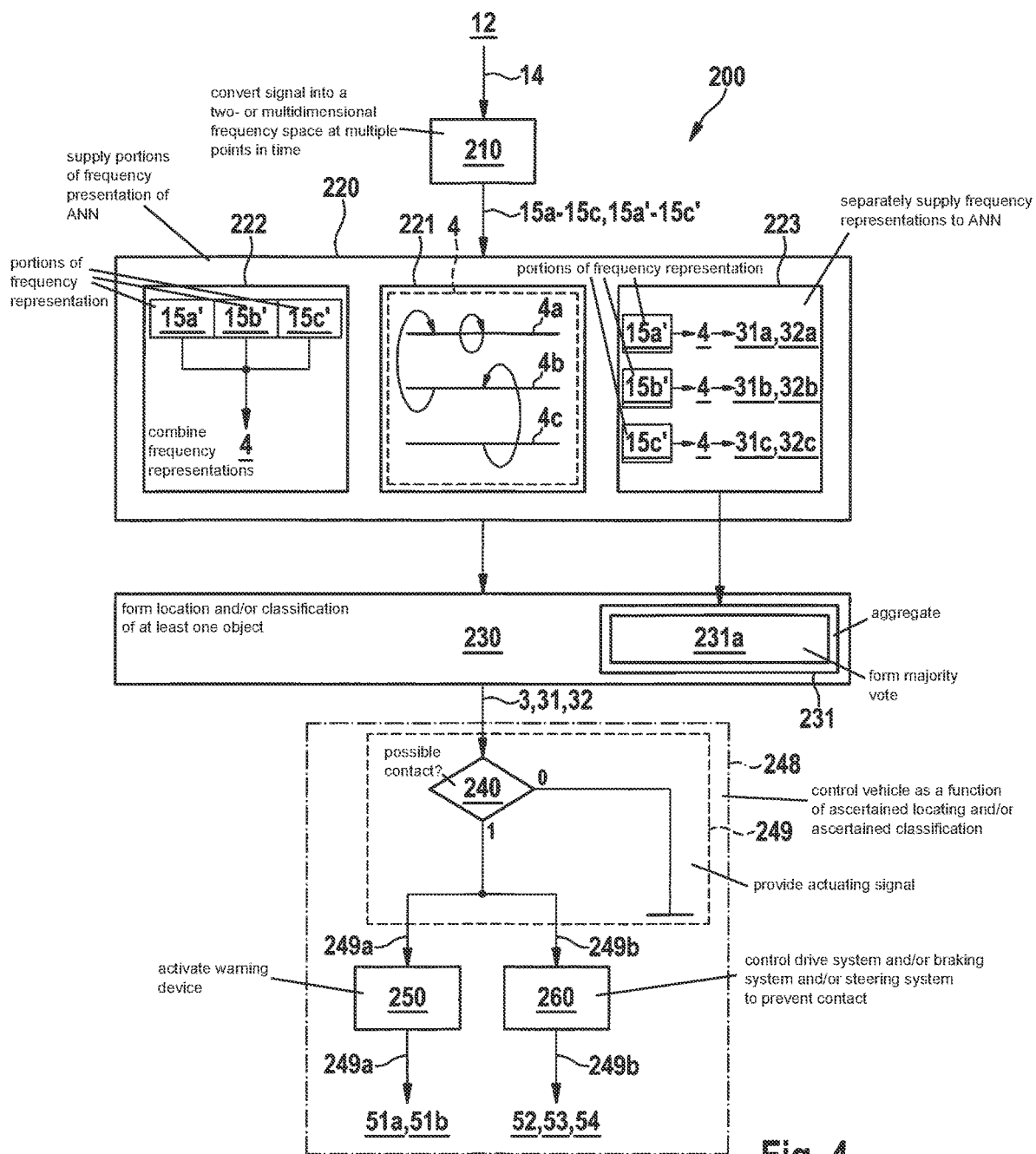
FIG. 4 shows one exemplary embodiment of method 200.

FIG. 4 shows one exemplary embodiment of method 200. Analogously to step 110, signal 14 recorded by receiver 12 is transformed into a two- or multidimensional frequency space in step 210. However, in contrast to FIG. 1 this now takes place at multiple points in time, so that multiple two- or multidimensional frequency representations 15a through 15c result, from which in turn portions 15a' through 15c' may be selected in each case.

These portions 15a' through 15c', which once again may each be complete frequency representation 15a through 15c, are supplied to ANN 4 in step 220. For this purpose, three examples of options are depicted in FIG. 4. Locating 31 and/or classification 32 of at least one object 3 are/is formed in step 230.

According to block 221, a recurrent ANN 4 may be used in which there are connections within layers 4a through 4c, and/or back-references from deeper layers 4a through 4c to higher layers 4a through 4c.

Portions 15a'-through 5c' of frequency representations 15a-15c may be combined into a single input, which is then supplied to ANN 4, according to block 222.

Each portion 15a' through 15c' of a frequency representation 15a through 15c may be separately supplied to ANN 4 according to block 223, in each case resulting in a separate locating 31a through 31c and/or a separate classification 32a through 32c. Locatings 31a through 31c and/or classifications 32a through 32c are then aggregated according to block 231, it being optionally possible for a majority vote to be formed from classifications 32a through 32c according to subblock 231a.

Further steps 240-260, which make use of overall generated locating 31 and/or overall generated classification 32, run completely analogously to steps 140-160 described in greater detail in conjunction with FIG. 1.

In general, vehicle 50 is controlled according to block 248 as a function of ascertained locating 31 and/or of ascertained classification 32 of at least one object 3. In particular, an actuating signal 249a, 249b for at least one actuator 51a, 51b, 52 through 54 of vehicle 50 is provided in subblock 249 as a function of locating 31 and/or of classification 32, and this actuator 51a, 51b, 52 through 54 is controlled via this actuating signal 249a, 249b in step(s) 250 and/or 260.

FIG. 5 shows an example of a traffic situation in which method 100, 200 may be applied. A vehicle 50 with radar sensor 1, which includes a transmitter 11 and a receiver 12, follows a trajectory 50a and approaches an intersection 60 on road 61, at which road 61 meets further roads 62 through 64. Transmitter 11 of radar sensor 1 emits radar waves 13 into a monitored area 2. Radar waves 14 reflected on objects 3 in monitored area 2 are recorded by receiver 12 of radar sensor 1. For example, metal trash bin 3' reflects at position 3b' on the road intersection.

In the example shown in FIG. 5, a further vehicle follows trajectory 3b and approaches intersection 60 on road 64. The vehicle at its instantaneous location 3b is detected as an object 3 by radar sensor 1. Since trajectory 3a of object 3 intersects trajectory 50a of vehicle 50, countermeasures are taken on board vehicle 50.

In the situation shown in FIG. 5, the benefit of method 100, 200 in particular is that the locating and classification of vehicle 3 are less adversely affected by metal trash bin 3', which is situated in the same direction relative to the radar sensor. Since trash bin 3' is much smaller than vehicle 3, but on the other hand is also much closer to radar sensor 1, radar waves 14' transmitted back from trash bin 3' may generate a signal in receiver 12 that has a strength similar to radar waves 14 transmitted back from vehicle 3. By use of piece of dimensioning information 16, the signal contributions from trash bin 3' on the one hand and from vehicle 3 on the other hand may be reliably distinguished from one another.

What is claimed is:

1. A method for locating and/or classifying at least one object in an area that is monitored by at least one radar sensor, the radar sensor including at least one transmitter and at least one receiver for radar waves, the method comprising the following steps:
   converting a signal recorded by the receiver into a two- or multidimensional frequency representation;
   supplying at least a portion of the two- or multidimensional frequency representation as an input to an artificial neural network (ANN) which includes a sequence of layers with neurons, at least one of the layers of the ANN being additionally supplied with a piece of dimensioning information which characterizes a size and/or absolute position of objects detected in the portion of the two- or multidimensional frequency representation; and
   taking a location of the object and/or a classification of the object from the ANN as an output.

2. The method as recited in claim 1, wherein the piece of dimensioning information characterizes:
   a distance of at least one location, detected by the portion of the two- or multidimensional frequency representation, from the radar sensor, and/or
   an azimuth angle at which at least one location, detected by the portion of the two- or multidimensional frequency representation, is situated relative to the radar sensor, and/or
   a distance of multiple locations, detected by the portion of the two- or multidimensional frequency representation, from one another.

3. The method as recited in claim 1, wherein the piece of dimensioning information is supplied to the at least one of the layers of the ANN as a further input variable that is independent of a content of the portion of the two- or multidimensional frequency representation.

4. The method as recited in claim 1, wherein the piece of dimensioning information is added to the portion of the two- or multidimensional frequency representation as an additional information layer, and/or the piece of dimensioning information is superimposed on the input of the at least one of layers of the ANN.

5. The method as recited in claim 1, wherein the piece of dimensioning information is taken from the two- or multidimensional frequency representation.

6. The method as recited in claim 1, wherein the piece of dimensioning information is taken: (i) from measuring data that have been detected via a further sensor that is different from the radar sensor, and/or (ii) from a digital map.

7. The method as recited in claim 1, wherein in the portion of the two- or multidimensional frequency representation, information outside a two- or multidimensional sphere is suppressed around a center.

8. The method as recited in claim 1, wherein the two- or multidimensional frequency representation is selected in which one direction represents a distance of the object from the radar sensor, and a further direction represents an azimuth angle of the object relative to the radar sensor.

9. The method as recited in claim 1, wherein a vehicle is controlled as a function of the location of the object from the ANN and/or of the classification of at least one object from the ANN.

10. The method as recited in claim 1, wherein an actuating signal is provided for at least one actuator of a vehicle as a function of the location of the object from the ANN and/or of the classification of the object from the ANN, and the actuator is controlled with the actuating signal.

11. The method as recited in claim 1, wherein in response to an object having been recognized and an up-to-date planned and/or traveled trajectory of a vehicle contacting the location and/or the trajectory of the object: (i) a warning device is activated, and/or (ii) a drive system and/or a braking system and/or a steering system of the vehicle is controlled to prevent the contact.

12. A method for locating and/or classifying at least one object in an area that is monitored by at least one radar sensor, the radar sensor including at least one transmitter and at least one receiver for radar waves, the method comprising:
   converting a signal recorded by the receiver at various points in time in each case into a two- or multidimensional frequency representation;
   supplying at least a portion of each of the two- or multidimensional frequency representations as an input to an artificial neural network (ANN) which includes a sequence of layers with neurons; and
   taking a location of the object and/or a classification of the object from the ANN as an output;

wherein multiple portions of the two- or multidimensional frequency representations are supplied in succession to the same ANN as inputs, and the locations and/or the classifications obtained in each case from the ANN are aggregated to form a location and/or a classification.

13. The method as recited in claim 12, wherein the ANN is a recurrent ANN in which an output of at least one neuron is supplied as an input to at least one neuron of the same layer, or to at least one neuron of a preceding layer in the sequence.

14. A method, for locating and/or classifying at least one object in an area that is monitored by at least one radar sensor, the radar sensor including at least one transmitter and at least one receiver for radar waves, the method comprising:
converting a signal recorded by the receiver at various points in time in each case into a two- or multidimensional frequency representation;
supplying at least a portion of each of the two- or multidimensional frequency representations as an input to an artificial neural network (ANN) which includes a sequence of layers with neurons; and
taking a location of the object and/or a classification of the object from the ANN as an output;
wherein multiple portions of the two- or multidimensional frequency representations are jointly supplied to the same ANN as inputs;
wherein the classifications are aggregated by a majority vote to form a classification.

15. The method as recited in claim 14, wherein the ANN is a recurrent ANN in which an output of at least one neuron is supplied as an input to at least one neuron of the same layer, or to at least one neuron of a preceding layer in the sequence.

16. A non-transitory machine-readable data medium on which is stored a computer program for locating and/or classifying at least one object in an area that is monitored by at least one radar sensor, the radar sensor including at least one transmitter and at least one receiver for radar waves, the computer program, when executed by a computer, causing the computer to perform the following steps:
converting a signal recorded by the receiver into a two- or multidimensional frequency representation;
supplying at least a portion of the two- or multidimensional frequency representation as an input to an artificial neural network (ANN) which includes a sequence of layers with neurons, at least one of the layers of the ANN being additionally supplied with a piece of dimensioning information which characterizes a size and/or absolute position of objects detected in the portion of the two- or multidimensional frequency representation; and
taking a location of the object and/or a classification of the object from the ANN as an output.

17. A computer configured to locate and/or classify at least one object in an area that is monitored by at least one radar sensor, the radar sensor including at least one transmitter and at least one receiver for radar waves, the computer configured to:
convert a signal recorded by the receiver into a two- or multidimensional frequency representation;
supply at least a portion of the two- or multidimensional frequency representation as an input to an artificial neural network (ANN) which includes a sequence of layers with neurons, at least one of the layers of the ANN being additionally supplied with a piece of dimensioning information which characterizes a size and/or absolute position of objects detected in the portion of the two- or multidimensional frequency representation; and
take a location of the object and/or a classification of the object from the ANN as an output.

* * * * *